US010704812B2

(12) United States Patent
Kim et al.

(10) Patent No.: US 10,704,812 B2
(45) Date of Patent: Jul. 7, 2020

(54) REFRIGERATOR

(71) Applicant: LG ELECTRONICS INC., Seoul (KR)

(72) Inventors: Seokhyun Kim, Seoul (KR); Minkyu Oh, Seoul (KR); Heayoun Sul, Seoul (KR); Jeehoon Choi, Seoul (KR); Hyoungkeun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 101 days.

(21) Appl. No.: 15/918,292

(22) Filed: Mar. 12, 2018

(65) Prior Publication Data
US 2018/0266736 A1 Sep. 20, 2018

(30) Foreign Application Priority Data

Mar. 14, 2017 (KR) .................. 10-2017-0031978

(51) Int. Cl.
F25B 21/02 (2006.01)
F25B 21/04 (2006.01)
(Continued)

(52) U.S. Cl.
CPC .............. *F25B 21/04* (2013.01); *F25B 21/02* (2013.01); *F25B 47/02* (2013.01); *F25D 17/062* (2013.01);
(Continued)

(58) Field of Classification Search
CPC ................ F25B 21/02; F25B 2321/021; F25B 2321/0211; F25B 2700/2104; F25B 2600/11; F25B 2600/112
See application file for complete search history.

(56) References Cited

U.S. PATENT DOCUMENTS 5,448,891 A 9/1995 Nakagiri
5,927,078 A 7/1999 Watanabe et al.
(Continued)

FOREIGN PATENT DOCUMENTS

KR 10-1997-0002215 1/1997
KR 10-2010-0057216 5/2010

OTHER PUBLICATIONS

European Search Report Issued in Application No. 18161701.0 dated Aug. 6, 2018.
(Continued)

*Primary Examiner* — Brian M King
(74) *Attorney, Agent, or Firm* — KED & Associates LLP

(57) ABSTRACT

A refrigerator may include a sensor configured to measure temperature, a thermoelectric device module having at least one fan and configured to cool the storage compartment; and a controller that controls a rotation speed of the fan. The rotation speed of the fan may be determined based on at least one of whether a storage compartment temperature condition measured by the sensor exists or whether an initial power input condition exists. The thermoelectric device module may be controlled differently in a first temperature region, in a second temperature region, and in a third temperature region of the storage compartment. When an initial power condition exist such that power is initially supplied to the refrigerator, the fan is controlled to spin at a rotation speed that exceeds a rotation speed corresponding to the third temperature region until a preset temperature within the second temperature region is reached.

17 Claims, 6 Drawing Sheets

(51) Int. Cl.
　　　*F25D 21/08*　　(2006.01)
　　　*F25B 47/02*　　(2006.01)
　　　*F25D 17/06*　　(2006.01)
　　　*F25D 21/06*　　(2006.01)

(52) U.S. Cl.
　　　CPC ...... *F25D 21/08* (2013.01); *F25B 2321/0211* (2013.01); *F25B 2321/0212* (2013.01); *F25B 2321/0251* (2013.01); *F25B 2500/19* (2013.01); *F25B 2600/11* (2013.01); *F25B 2700/02* (2013.01); *F25B 2700/2104* (2013.01); *F25D 21/06* (2013.01); *F25D 2700/12* (2013.01)

(56) References Cited

U.S. PATENT DOCUMENTS

| | | | |
|---|---|---|---|
| 2002/0194856 A1* | 12/2002 | Yeo | B60H 1/00557 62/179 |
| 2003/0115892 A1* | 6/2003 | Fu | F25D 17/042 62/187 |
| 2008/0000242 A1 | 1/2008 | Jung | |
| 2008/0022696 A1 | 1/2008 | Welle et al. | |
| 2008/0078187 A1 | 4/2008 | Ye et al. | |
| 2011/0016887 A1* | 1/2011 | Lee | A23B 7/045 62/3.2 |
| 2012/0047911 A1 | 3/2012 | Bhavsar et al. | |
| 2012/0312030 A1* | 12/2012 | Lu | F25B 21/02 62/3.6 |
| 2013/0139524 A1 | 6/2013 | Kim et al. | |
| 2015/0075184 A1 | 3/2015 | Edwards | |
| 2015/0239322 A1 | 8/2015 | Yokoo | |
| 2016/0018141 A1 | 1/2016 | Edwards | |
| 2017/0057323 A1 | 3/2017 | Neu | |

OTHER PUBLICATIONS

European Search Report dated Aug. 13, 2018 issued in Application No. 18161683.0.
United States Office Action dated Feb. 7, 2020 issued in co-pending related U.S. Appl. No. 15/918,063.
U.S. Office Action dated Sep. 20, 2019 issued in U.S. Appl. No. 15/918,063.

* cited by examiner

REFRIGERATOR

CROSS-REFERENCE TO RELATED APPLICATION

This application claims priority under 35 U.S.C. § 119 to Korean Application No. 10-2017-0031978, filed on Mar. 14, 2017, whose entire disclosure is hereby incorporated by reference.

BACKGROUND

1. Field

The present disclosure relates to a refrigerator having a thermoelectric device and fans that exhibits high refrigeration performance and method of controlling the same.

2. Background

Refrigerators having thermoelectric devices including fans and methods of controlling the same are known. However, they suffer from various disadvantages.

BRIEF DESCRIPTION OF THE DRAWINGS

The embodiments will be described in detail with reference to the following drawings in which like reference numerals refer to like elements wherein.

DETAILED DESCRIPTION

Figure 1:
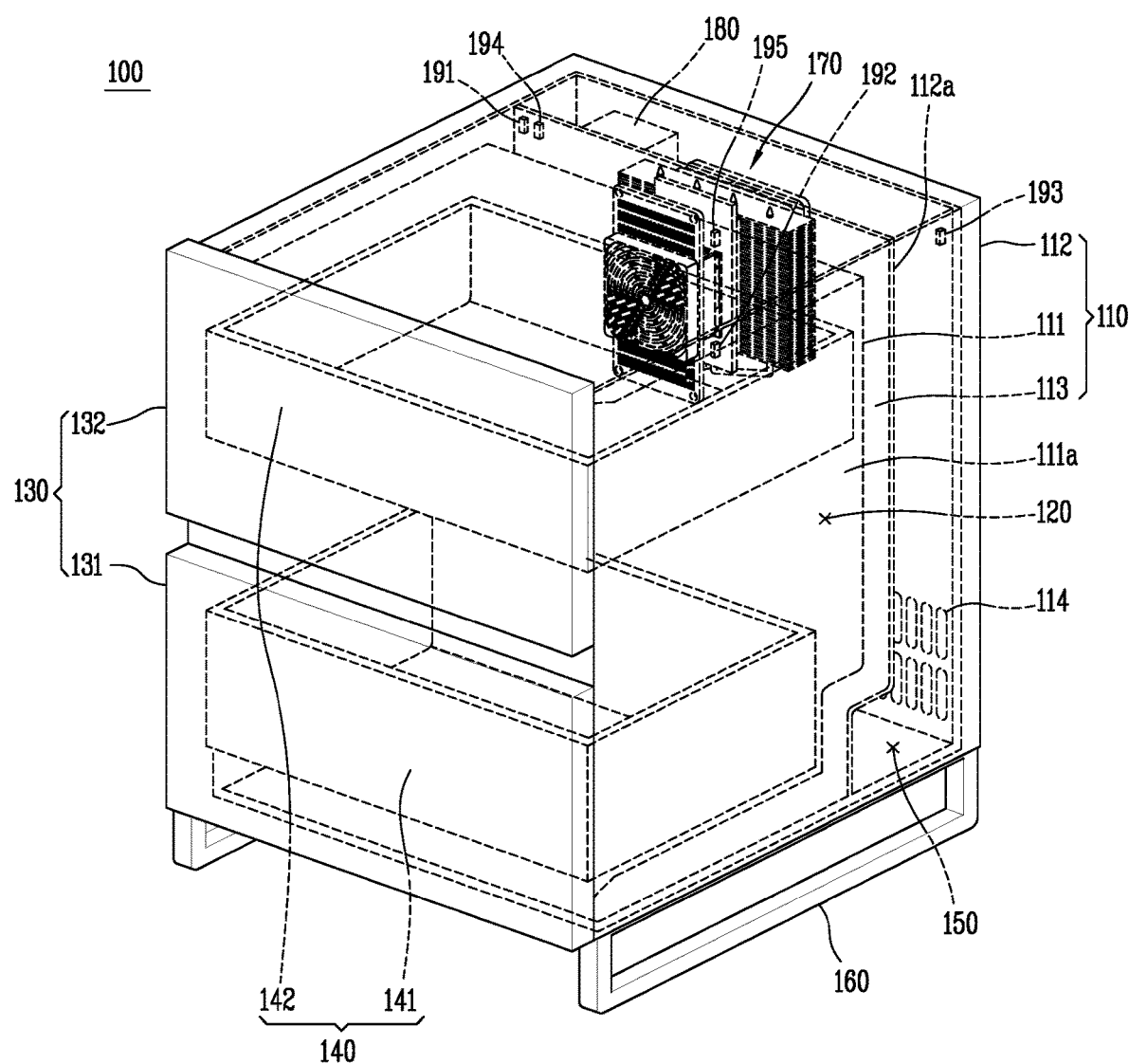
FIG. 1 is a conceptual diagram showing an example of a refrigerator having a thermoelectric device module.

Hereinafter, a refrigerator and a method of controlling the refrigerator according to the present disclosure will be described in more detail with reference to the drawings. In this specification, the same or similar components in different embodiment are assigned the same or similar reference numerals, and redundant descriptions will be omitted. Singular expressions include plural referents unless clearly indicated otherwise in the context.

A thermoelectric device refers to a device that absorbs and generates heat using the Peltier effect. The Peltier effect is a phenomenon in which, when a voltage is applied to two ends of the device, heat is absorbed at one of the two sides and heat is generated at the other side, depending on the direction of current. This thermoelectric device may be used in a refrigerator in place of refrigeration cycle equipment.

Generally, a refrigerator is an appliance including a food storage space that can block heat coming from the outside by a cabinet and doors, inside of which is filled with insulation, and a refrigeration device including an evaporator that absorbs heat from the food storage space and a heat sink that dissipates collected heat out of the food storage space. In this manner, the food storage space may be refrigerated enabling it to store food for a long period of time without spoiling by keeping the food storage space at low temperatures which make microbial survival and growth difficult.

The refrigerator may be divided into a refrigerator compartment that stores food at above-freezing temperatures and a freezer compartment that stores food at below-freezing temperatures. The refrigerator may be classified as a top freezer refrigerator with a top freezer and a bottom refrigerator, a bottom freezer refrigerator with a bottom freezer and a top refrigerator, a side-by-side refrigerator with a left freezer and a right refrigerator, etc., depending on the placement of the refrigerator compartment and the freezer compartment. In order for the user to stock food in the food storage space or take it out with ease, the refrigerator may have a plurality of shelves and drawers in the food storage space.

In a case where a cooling device for cooling the food storage space is implemented as a cooling cycle device that includes a compressor, a condenser, an expander, an evaporator, etc., it is difficult to block out vibration and noise generated by the compressor. The noise and vibration are an inconvenience to the user and undesirable—especially in recent times, when refrigerators are often installed in living rooms, bedrooms, etc., as pieces of functional furniture or cosmetic refrigerators as well as in kitchens.

By using a thermoelectric device in a refrigerator, the food storage space may be cooled without need for a refrigeration cycle device. Notably, the thermoelectric device does not generate noise and vibration, as opposed to the compressor. Thus, the thermoelectric device, when used in a refrigerator, can solve the problem of noise and vibration, even when the refrigerator is installed somewhere other than the kitchen.

Various refrigerators having thermoelectric devices and methods of controlling the same are known. However, they suffer from various disadvantages. For example, cooling power that can be obtained using a thermoelectric device is smaller than that obtained from a refrigeration cycle device. Moreover, because the thermoelectric device has unique features that are distinct from the refrigeration cycle device, appropriate methods of controlling cooling operations used in a refrigerator with a thermoelectric device have different requirements from that used in a refrigerator with a refrigeration cycle device.

These and other disadvantages of refrigerators having thermoelectric devices are addressed in the present disclosure. An aspect of the present disclosure is to propose a control method suitable for a refrigerator with a thermoelectric device that either cools or generates heat depending on voltage polarity, and a refrigerator controlled by this control method.

Another aspect of the present disclosure is to provide a method of controlling a refrigerator, that can control fans in a thermoelectric device module based on a storage compartment temperature condition and an initial power input condition, and a refrigerator controlled by this control method.

Yet another aspect of the present disclosure is to provide a control method that can achieve sufficient cooling performance and fan noise reduction depending on the temperature of the storage compartment, and a refrigerator controlled by this control method.

FIG. 1 is a conceptual diagram showing an example of a refrigerator 100 having a thermoelectric device module 170. The refrigerator 100 may be configured to function, for example, as a piece of furniture as well as a refrigerator. The refrigerator may be configured as a piece of furniture such as an end table, coffee table, night end table, a kitchen table, or another appropriate piece of furniture in which a refrigerator is desirable. Merely for ease of discussion, the refrigerator will be described with reference to a side table. The side table may be configured such that a table lamp, etc. may be placed on top and small items may be stored inside. The refrigerator 100 may be configured to store food at low temperatures while functioning as a piece of furniture.

The exterior of the refrigerator 100 may be formed by a cabinet 110 and doors 130. The cabinet 110 may be formed by an inner casing 111, an outer casing 112, and an insulator 113. The inner case 111 may be mounted on the inside of the outer casing 112, and may form a storage compartment 120 for storing food at low temperatures. The refrigerator in this case may be limited in size so that the refrigerator 100 may be used as a side table, therefore, the storage compartment 120 formed by the inner casing 111 may also be limited in size, for example, about 200 L.

The outer casing 112 may form the exterior of the side table shape. Since the doors 130 may be mounted on the front of the refrigerator 100, the outer casing 112 may form the exterior of the refrigerator 100 except the front. The top surface of the outer casing 112 may be flat so that small items such as a lamp may be placed on it.

The insulator 113 may be disposed between the inner casing 111 and the outer casing 112. The insulator 113 is for inhibiting heat transfer from the outside, which is relatively hot, to the storage compartment 120, which is relatively cold.

The doors 130 may be fitted to the front of the cabinet 110. The doors 130, along with the cabinet 110, may form the exterior of the refrigerator 100. The doors 130 may be configured to open and close the storage compartment 120 or mounted on hinges to swing open. The refrigerator 100 may have two or more doors 131 and 132, and each door 130 may be disposed in a vertical orientation, as illustrated in FIG. 1. It should be appreciated that other configurations are possible.

Drawers 140 for efficient use of space may be mounted to the storage compartment 120. The drawers 140 may form a food storage area within the storage compartment 120. The doors 130 may be slideable or may swing open. When the doors are slideable, the drawers 140 may be attached to the doors 130, and may be pulled in and out from the storage compartment 120 together with the doors 130.

The two drawers 141 and 142 may be disposed vertically to correspond to the doors 130. The drawers 141 and 142 may be respectively attached to the doors 131 and 132, and the drawers 141 and 142 attached to the doors 131 and 132 may be pulled out from the storage compartment 120, along with the doors 131 and 132 as the doors 131 and 132 slide. When the doors are on hinges to swing open, the drawers 140 may be configured to slide in/out separately from the door 130.

A mechanical compartment 150 may be formed behind the storage compartment 120. To form the mechanical compartment 150, the outer casing 112 may have a sidewall 112a. In this case, the insulator 113 is disposed between the sidewall 112a and the inner casing 111. The mechanical compartment 150 may be equipped with various types of electrical and mechanical equipment for running the refrigerator 100.

A support 160 may be mounted to the bottom of the cabinet 110. As shown in FIG. 1, the support 160 may be structured to raise the refrigerator 100 off of the floor. When installed in a bedroom or the like, the refrigerator 100 may be more accessible to or in closer proximity to the user than when the refrigerator 100 is installed in a kitchen. Thus, it is desirable that the refrigerator 100 be spaced apart from the floor to make it easy to clean up dust or other debris piled up between the refrigerator 100 and the floor. Since the support 160 allows the cabinet 110 to be spaced apart from the floor where the refrigerator 100 is to be installed, this structure makes cleaning easier.

Unlike other home electronic appliances, the refrigerator 100 may operate 24 hours a day. For this reason, if the refrigerator 100 is placed beside a bed, noise and vibration from the refrigerator 100 may be transmitted to a person lying on the bed to disturb the person's sleep or otherwise cause inconvenience. Therefore, the refrigerator 100 should achieve low-noise and low-vibration performance in order that the refrigerator 100 suitable for placement beside a bed.

If a refrigeration cycle device including a compressor is used for cooling the storage compartment 120 of the refrigerator 100, it is difficult to block out noise and vibration generated by the compressor. Accordingly, the refrigeration cycle device should be used in a restricted way to achieve low-noise and low-vibration performance, and the refrigerator 100 may cool the storage compartment 120 using the thermoelectric device module 170.

The thermoelectric device module 170 may be mounted to a rear wall 111a of the storage compartment 120 to cool the storage compartment 120. The thermoelectric device module 170 includes a thermoelectric device. The thermoelectric device refers to a device that cools and generates heat using the Peltier effect, as previously described. By placing the heat absorption side of the thermoelectric device toward the storage compartment 120 and the heat generation side of the thermoelectric device toward the outside of the refrigerator 100, the storage compartment 120 may be cooled by running the thermoelectric device.

The controller 180 may be configured to control the overall operation of the refrigerator 100. For example, the controller 180 may control the output power of the thermoelectric device or fans equipped in the thermoelectric device module 170, and may also control the operations of different types of components equipped in the refrigerator 100. The controller 180 may include one or more printed circuit boards PCB and a microcomputer, and other appropriate IC's or processors based on the application. The controller 180 may be mounted in, but not necessarily limited to, the mechanical compartment 150.

When the controller 180 controls the thermoelectric device module 170, the output power of the thermoelectric device may be controlled based on the temperature of the storage compartment 120, a set temperature input by the user, the outside temperature (or exterior temperature) of the refrigerator 100, or another appropriate factor based on desired functions. The outside temperature may be an ambient or room temperature outside the storage compartment or outside the body of the refrigerator. Cooling operation, defrosting operation (or defrost operation), load handling operation (load response operation), etc. may be determined as controlled by the controller 180, and the output power of the thermoelectric device may depend on the operation determined by the controller 180.

The temperature of the storage compartment 120 or the outside temperature of the refrigerator may be measured by a sensor unit (or sensor) 191, 192, 193, 194, and 195 provided in the refrigerator. The sensor unit 191, 192, 193, 194, and 195 may include at least one device that measures physical properties, including temperature sensors 191, 192, and 193, a humidity sensor 194, a wind pressure sensor 195, or the like. For example, the temperature sensors 191, 192, and 193 may be mounted to the storage compartment 120, the thermoelectric device module 170, and the outer casing 112, respectively, and the temperature sensors 191, 192, and 193 may measure the temperature of the area where they are mounted.

The in-refrigerator temperature sensor 191 may be mounted to the storage compartment 120, and may be configured to measure the temperature in the storage compartment 120. The defrosting temperature sensor 192 (or defrost temperature sensor, defrost sensor) may be mounted to the thermoelectric device module 170, and may be configured to measure the temperature of the thermoelectric device module 170. The external air temperature sensor 193 may be mounted to the outer casing 112, and may be configured to measure the outside temperature of the refrigerator 100.

The humidity sensor 194 may be mounted to the storage compartment 120, and may be configured to measure the humidity of the storage compartment 120. The air pressure sensor 195 may be mounted to the thermoelectric device module 170, and may be configured to measure the air pressure of a first fan 173.

Figure 2:
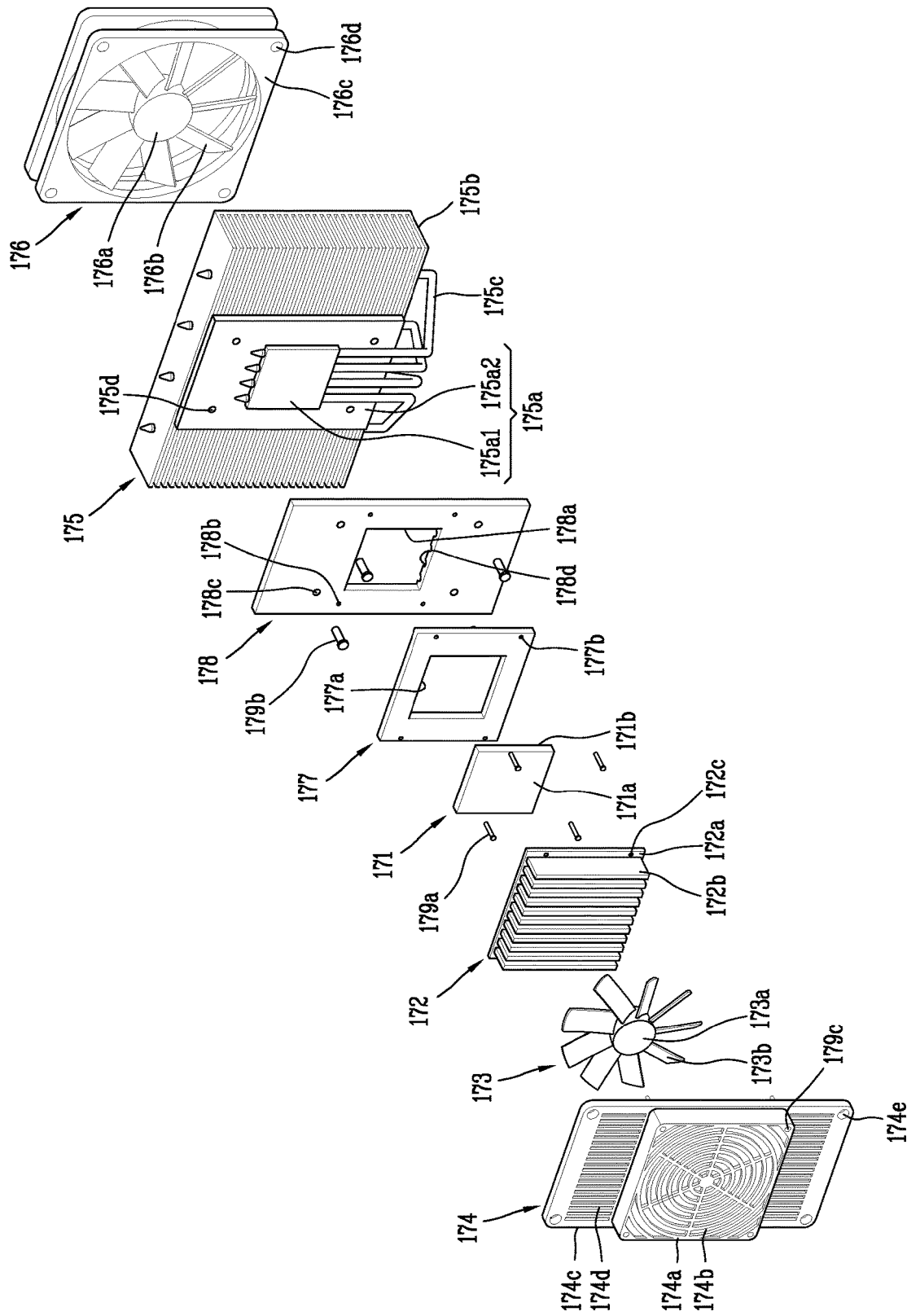
FIG. 2 is an exploded perspective view of the thermoelectric device module.

FIG. 2 is an exploded perspective view of the thermoelectric device module 170. Merely to facilitate description, the thermoelectric device module will be described herein with reference to the refrigerator 100 of FIG. 1, but it should be appreciated that the thermoelectric device module of the present disclosure may be applied to various types of devices.

The thermoelectric device module 170 may include a thermoelectric device 171, a first heat sink 172, the first fan 173, a second heat sink 175, a second fan 176, and an insulator 177. The thermoelectric device module 170 operates between first and second areas that are separate from each other, and is configured to absorb heat in one of the two areas and dissipates heat in the other area.

The first area and the second area refer to areas that are spatially separated from each other by a boundary. When the thermoelectric device module 170 is used in the refrigerator 100, the first area may correspond to either the storage compartment 120 or the outside of the refrigerator 100, and the second area may correspond to the other.

The thermoelectric device 171 may be formed by connecting a plurality of PN junctions in series, each of them consisting of a P-type semiconductor and an N-type semiconductor. The thermoelectric device 171 has a heat absorption part 171a and a heat dissipation part 171b (or heat radiation part) that work in opposite directions. For efficient heat transfer, it is desirable that the heat absorption part 171a and the heat radiation part 171b be shaped in such a way as to enable their surfaces to make contact with each other. Thus, the heat absorption part 171a may be called a heat absorption surface and the heat dissipation part 171b may be called a heat dissipation surface. Also, the heat absorption part 171a and the heat dissipation part 171b may be generally called a first part and a second part, a first surface and a second surface, or first side and a second side. This naming is used herein merely for illustration purposes and does not limit the scope of the disclosure.

The first heat sink 172 may make contact with the heat absorption part 171a of the thermoelectric device 171. The first heat sink 172 may undergo heat exchange with the first area. The first area may correspond to the storage compartment 120, and may undergo heat exchange with the air inside the storage compartment 120.

The first fan 173 may be mounted to face the first heat sink 172, and may blow air to facilitate the heat transfer of the first heat sink 172. Since heat transfer is a natural phenomenon, the first heat sink 172 can exchange heat with the air in the storage compartment 120 without the first fan 173. Still, the heat transfer of the first heat sink 172 may be facilitated even more since the thermoelectric device module 170 includes the first fan 173.

The first fan 173 may be covered with a cover 174. The cover 174 may include other parts, apart from a portion 174a (or grill, guard) surrounding the first fan 173. The part 174a covering the first fan 173 may have a plurality of holes 174b (or openings) to allow the air inside the storage compartment 120 to pass through the cover 174.

Moreover, the cover 174 may have a structure that can be fixed to the rear wall 111a of the storage compartment 120. In an example, FIG. 2 illustrates a structure in which the cover 174 has a portion 174c extending from both sides of the portion 174a surrounding the first fan 173 and screw fastening holes 174e for inserting screws are formed in the extending portion 174c. Further, screws 179c may be inserted into the portion surrounding the first fan 173 and further fix the cover 174 to the rear wall 111a. Holes 174b and 174d may be formed in the portion 174a surrounding the first fan 173 and the extending portion 174, respectively, to allow air to pass through.

The second heat sink 175 may be disposed to make contact with the heat radiation part 171b (or heat dissipation part) of the thermoelectric device 171. The second heat sink 175 may be configured to exchange heat with the second area. The second area corresponds to a space outside the refrigerator 100, and the second heat sink 175 may undergo heat exchange with the air outside the refrigerator 100.

The second fan 176 may be mounted to face the second heat sink 175, and may blow air to facilitate heat transfer of the second heat sink 175. The second fan 176 may facilitate the heat transfer of the second heat sink 175 in the same way as the first fan 173 facilitates the heat transfer of the first heat sink 172.

The second fan 176 may optionally have a shroud 176c. The shroud 176c may function to guide air. For example, as shown in FIG. 2, the shroud 176 may be configured to surround vanes 176b where it is spaced apart from the vanes 176c. Additionally, screw fastening holes 176d for fixing the second fan 176 may be formed in the shroud 176c.

The first heat sink 172 and the first fan 173 may correspond to the heat absorption side of the thermoelectric device module 170. The second heat sink 175 and the second fan 176 may correspond to the heat generation side of the thermoelectric device module 170.

At least one of the first and second heat sinks 172 and 175 may include a base 172a or 175a and fins 172b or 175b. It should be noted that the following non-limiting description will be given on the assumption that both the first heat sink 172 and the second heat sink 175 include bases 172a and 175a and fins 172b and 175b, respectively, but is not limited thereto.

The bases 172a and 175a may be configured to make surface contact with the thermoelectric device 171. The base 172a of the first heat sink 172 makes surface contact with the heat absorption part 171a of the thermoelectric device 171, and the base 175a of the second heat sink 175 makes surface contact with the heat dissipation part 171b of the thermoelectric device 171.

Ideally, the bases 172a and 175a and the thermoelectric device 171 make surface contact with each other, since thermal conductivity increases with increasing heat transfer surface area. Moreover, a thermal conductor (thermal grease, thermal compound or the like) may be used to increase thermal conductivity by filling tiny gaps between the bases 172a and 175a and the thermoelectric device 171.

The fins 172b and 175b protrude from the bases 172a and 175b so as to exchange heat with the air in the first area or the air in the second area. The first area may correspond to the storage compartment 120, and the second area may correspond to the outside of the refrigerator 100. Thus, the fins 172b of the first heat sink 172 may be configured to undergo heat exchange with the air in the storage compartment 120, and the fins 175b of the second heat sink 175 may be configured to undergo heat exchange with the air outside the refrigerator 100.

The fins 172b and 175b may be spaced at prescribed intervals, because the heat transfer surface area is increased by spacing the fins 172b and 175b at intervals. There may be reduced or no heat transfer at surfaces between the fins 172b and 175b if the fins 172b and 175b are placed close to one another, whereas there may be improved heat transfer at surfaces between the fins 172b and 175b if the fins 172b and 175 are spaced at intervals. Since thermal conductivity increases with increasing heat transfer surface area, the surface area of the fins exposed to the first area and second area should be increased to improve the heat transfer performance of the heat sinks.

Moreover, the thermal conductivity of the second heat sink 175 corresponding to the heat generation side should be greater than that of the first heat sink 172, in order for the first heat sink 172 corresponding to the heat absorption side to provide sufficient cooling. This is because quicker heat dissipation by the heat dissipation part 171b of the thermoelectric device 171 allows more heat absorption by the heat absorption part 171a. This accounts for the fact that the thermoelectric device 171 is not merely a thermal conductor but a device that, when a voltage is applied, absorbs heat at one side and dissipates heat at the other side. Therefore, the heat dissipation part 171b of the thermoelectric device 171 should provide more heat dissipation to ensure sufficient cooling by the heat absorption part 171a.

In view of this, when the first heat sink 172 absorbs heat and the second heat sink 175 dissipates heat, the heat transfer surface area of the second heat sink 175 should be larger than the heat transfer surface area of the first heat sink 172. Assuming that the entire heat transfer surface area of the first heat sink 172 is used for heat transfer, the heat transfer surface area of the second heat sink 175 may be, for example, three times as large as the heat transfer surface area of the first heat sink 172.

The same principle applies to the first fan 173 and the second fan 176. In order that the heat absorption side provide sufficient cooling, the air volume and air velocity of the second fan 176 may be greater than the air volume and air velocity of the first fan 173.

Since the second heat sink 175 requires a larger heat transfer surface area than the first heat sink 172, the base 175a and the fins 175b may have a larger surface area than the base 172a and the fin 172b of the first heat sink 172. Further, the second heat sink 175 may have a heat pipe 175c to rapidly distribute the heat transferred to the base 175a of the second heat sink 175 across the fins.

The heat pipe 175c may be configured to contain a heat transfer fluid, and one end of the heat pipe 175c may be inserted in the base 175c and the other end may be inserted through the fins 175b. The heat pipe 175c is a device that transfers heat from the base 175a to the fins 175b by the evaporation of the heat transfer fluid contained in it. Without the heat pipe 175c, heat transfer will only occur at some of the fins 175b close to the base 175c. This is because heat may not be sufficiently distributed across the fins 175b that are farther from the base 175a.

However, the heat pipe 175c enables heat transfer across all the fins 175b of the second heat sink 175. This is because heat from the base 175a can be distributed uniformly across the fins 175b, even as far as those at distal ends from the base 175a.

The base 175a of the second heat sink 175 may be formed of two layers 175a1 and 175a2 to contain the heat pipe 175c. The base 175a may be configured such that the first layer 175a1 surrounds one side of the heat pipe 175 and the second layer 175a2 surrounds the other side of the heat pipe 175c, the two layers 175a1 and 175a2 facing each other.

The first layer 175a1 may be disposed to make contact with the heat radiation part 171b of the thermoelectric device 171, and may be equal or similar in size to thermoelectric device 171. The second layer 175a2 may be connected to the fins 175b, and the fins 175b may protrude from the second layer 175a2. The second layer 175a2 may be greater in size than the first layer 175a1. One end of the heat pipe 175c may be disposed between the first layer 175a1 and the second layer 175a2 to run.

The insulator 177 may be mounted between the first heat sink 172 and the second heat sink 175. The insulator 177 may be formed in such a way as to surround the edge of the thermoelectric device 171. For example, as shown in FIG. 2, a hole 177a may be formed in the insulator 177, and the thermoelectric device 171 may be placed in the hole 177a. Here, the outer side surfaces of the thermoelectric device 171 may contact the inner side surfaces of the hole 177a.

As explained above, the thermoelectric device module 170 is not merely a thermal conductor but a device that cools the storage compartment 120 by absorbing heat on one side of the thermoelectric device 171 and dissipating heat on the other side. Thus, it may not be desirable to directly transfer heat from the first heat sink 172 to the second heat sink 175. This is because a decrease in temperature difference between the first heat sink 172 and the second heat sink 175 due to direct heat transfer can degrade the performance of the thermoelectric device 171. To prevent this phenomenon, the insulator 177 may be configured to avoid direct heat transfer between the first heat sink 172 and the second heat sink 175.

A fastener plate 178 may be disposed between the first heat sink 172 and the insulator 177 or between the second heat sink 175 and the insulator 177. The fastener plate 178 may be provided to mount the first heat sink 172 and the second heat sink 175. The first heat sink 172 and the second heat sink 175 may be screwed to the fastener plate 178 with screws.

Along with the insulator 177, the fastener plate 178 may be configured to surround the edge of the thermoelectric device 171. The fastener plate 178 may have a hole 178a corresponding to the thermoelectric device 171, like the insulator 177, and the thermoelectric device 171 may be placed in the hole 178a. However, the fastening plate 178 is not an essential component of the thermoelectric device module 170 and may be replaced by other components that can fix the first heat sink 172 and the second heat sink 175.

A plurality of screw fastening holes 178b and 178c for fixing the first heat sink 172 and the second heat sink 175 may be formed in the fastening plate 178. Screw fastening holes 172c and 177b corresponding the fastening plate 178 may be formed in the first heat sink 172 and the insulator 177, and screws 179a may be sequentially inserted into the screw fastening holes 172c, 177b, and 178b to fix the first heat sink 172 to the fastener plate 178. Screw fastening holes 175d corresponding to the fastener plate 178 may be formed in the second heat sink 175 as well, and screws 179b may be sequentially inserted into the screw fastening holes 178c and 175d to fix the second heat sink 175 to the fastener plate 178.

A recessed portion 178d for receiving one side of the heat pipe 175c may be formed in the fastener plate 178. The recessed portion 178d may be configured to correspond to the heat pipe 175c and partially surround it. Even if the second heat sink 175 has a heat pipe 175c, the second heat sink 175 may be firmly attached to the fastener plate 178 since the fastener plate 178 has the recessed portion 178d, thereby making the thermoelectric device module 170 thinner overall.

At least one of the aforementioned first and second fans 173 and 176 may have a hub 173a or 176a and vanes 173b or 176b. The hubs 173a and 176a may be attached to a central rotating shaft. The vanes 173b and 176b may be radially mounted around the hubs 173a and 176a.

The first fan 173 and the second fan 176 may be configured as axial flow fans 173 and 176. The axial flow fans 173 and 176 are different than a centrifugal fan. The axial flow fans 173 and 1776 may be configured to blow air in the direction of the axis of rotation, and air flows in in the direction of the axis of rotation of the axial flow fans 173 and 176 and flows out in the direction of the axis of rotation. On the contrary, the centrifugal fan is configured to blow air in a centrifugal direction (or circumferential direction), and air flows in in the direction of the axis of rotation of the centrifugal fan and flows out in the centrifugal direction. The first fan 173 is disposed to face the first heat sink 172, and the second fan 176 is disposed to face the second heat sink 175, and therefore it is desirable that the first and second fans 173 and 176 are configured as axial flow fans 173 and 176 which blow air in an axial direction.

Hereinafter, a method of controlling a refrigerator with the thermoelectric device module 170 that can provide high cooling performance and reduce power consumption and fan noise will be described.

Figure 3:
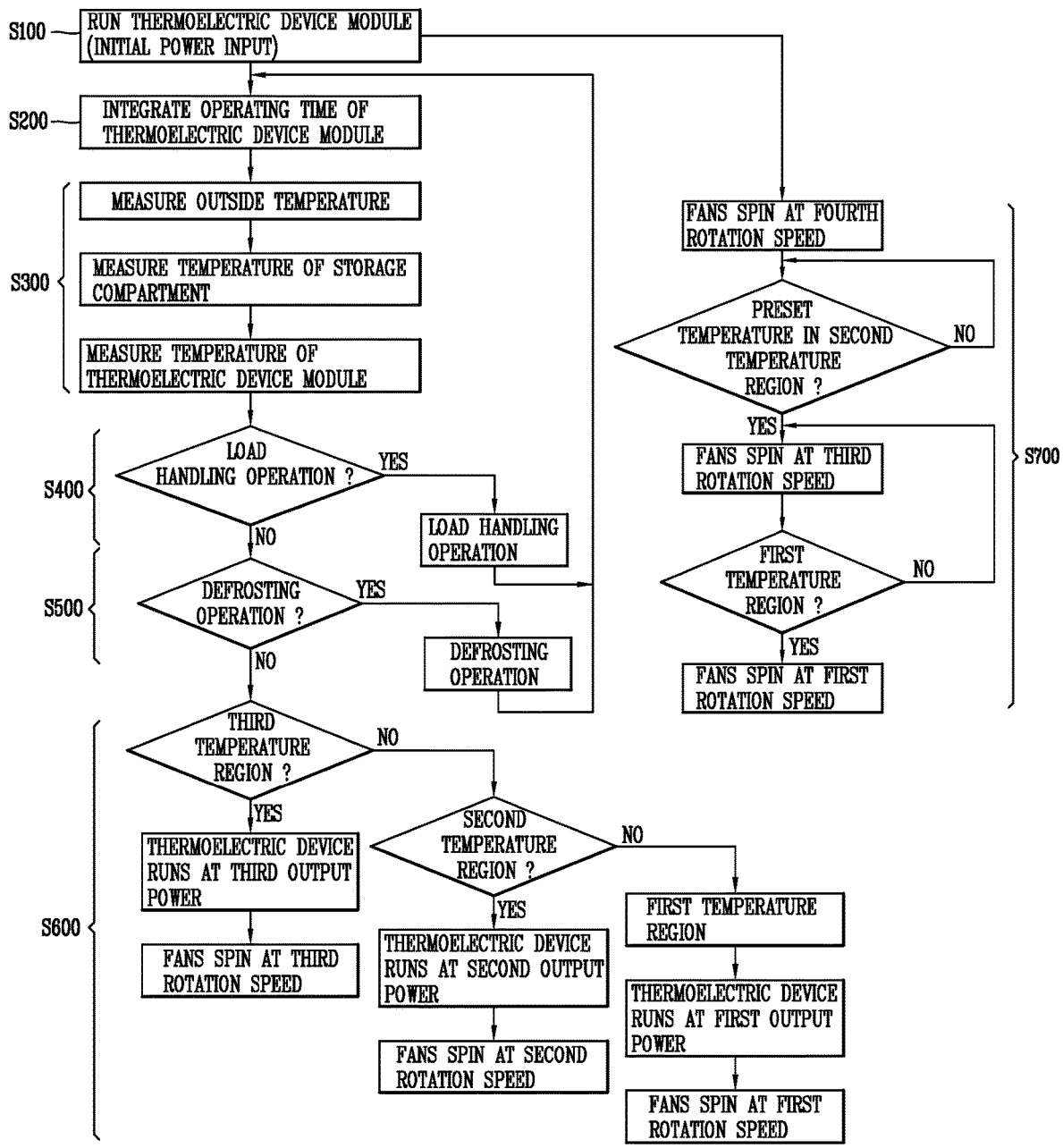
FIG. 3 is a flowchart of a method of controlling a refrigerator proposed in the present invention.

FIG. 3 is a flowchart of a method of controlling a refrigerator. First, the thermoelectric device module may start a cooling operation when powered for initial power input or other reasons (S100). Since the power to the thermoelectric device module may be cut off for natural defrosting (self-defrosting) or other reasons, the thermoelectric device modules may resume the cooling operation when power is applied again to the thermoelectric device module after completion of the natural defrosting process.

Next, the operating time of the thermoelectric device module is integrated (S200). The integration includes accumulatively counting the operating time of the thermoelectric device module. The integration of the operating time of the thermoelectric device modules may continue throughout the process of controlling the refrigerator, which accounts for why the defrosting operation is performed.

Next, the outside temperature of the refrigerator, the temperature of the storage compartment, and the temperature of the thermoelectric device module are measured (S300). Along with a set temperature input by the user, the temperatures measured in this step may be used for the controller to control the output power of the thermoelectric device or the output power of the fans.

It is determined whether a load handling operation is required (S400). If it is determined that a load handling operation is required, the load handling operation is started in such a way that the thermoelectric device runs at a preset output power and the fans rotate at a preset rotation speed. If it is determined that no load handling operation is required, the process proceeds to the next step.

It is determined whether a defrosting operation is required (S500). Once it is determined a defrosting operation is required, the defrosting operation is started in such a way that the thermoelectric device runs at a preset output power and the fans rotate at a preset rotation speed. In the case of natural defrosting, however, the power supplied to the thermoelectric device may be turned off. If it is determined that no defrosting operation is required, the process proceeds to the next step.

The load handling operation and the defrosting operation may be performed prior to a cooling operation (S600). Thus, if it is determined that no load handling operation and no defrosting operation are required, the cooling operation may be performed. The cooling operation may be controlled based on the temperature of the storage compartment and the temperature input by the user. The control results may be presented as the thermoelectric device's output power and the fans' output.

The output power of the thermoelectric device may be determined based on the temperature of the storage compartment, the set temperature input by the user, and the outside temperature of the refrigerator. Also, the rotation speed of the fans may be determined based on the temperature of the storage compartment. Here, the fans refer to at least one of the first or second fans of the thermoelectric device module.

For example, operation of the thermoelectric device and the fans may be controlled differently based multiple temperature ranges. If the temperature of the storage compartment in the flowchart of FIG. 3 corresponds to a third temperature region, the thermoelectric device runs at a third output power and the fans spin at a third rotation speed. If the temperature of the storage compartment corresponds to a second temperature region, the thermoelectric device runs at a second output power and the fans spin at a second rotation speed. If the temperature of the storage compartment corresponds to a first temperature region, the thermoelectric device runs at a first output power and the fans spin at a first rotation speed.

Meanwhile, the rotation speed of the fan may be determined based on an initial power input condition for initially supplying power to the refrigerator or re-supplying power to the refrigerator (S700). The initial power input condition may be a one-time condition (e.g., startup), and may not arise again during operation of the refrigerator unless the power supplied to the refrigerator is cut off.

Under the initial power input condition, the rotation speed of the fan may be different from that during normal cooling operation. This will be described after a description is made with reference to FIG. 4.

Hereinafter, the control of the thermoelectric device and fans for each temperature region will be described with reference to FIG. 4. It should be appreciated that the numerical values in the drawing and tables are non-limiting and are provided merely as examples to facilitate description, and do not constitute absolute values necessarily required for the control method of the present disclosure.

Figure 4:
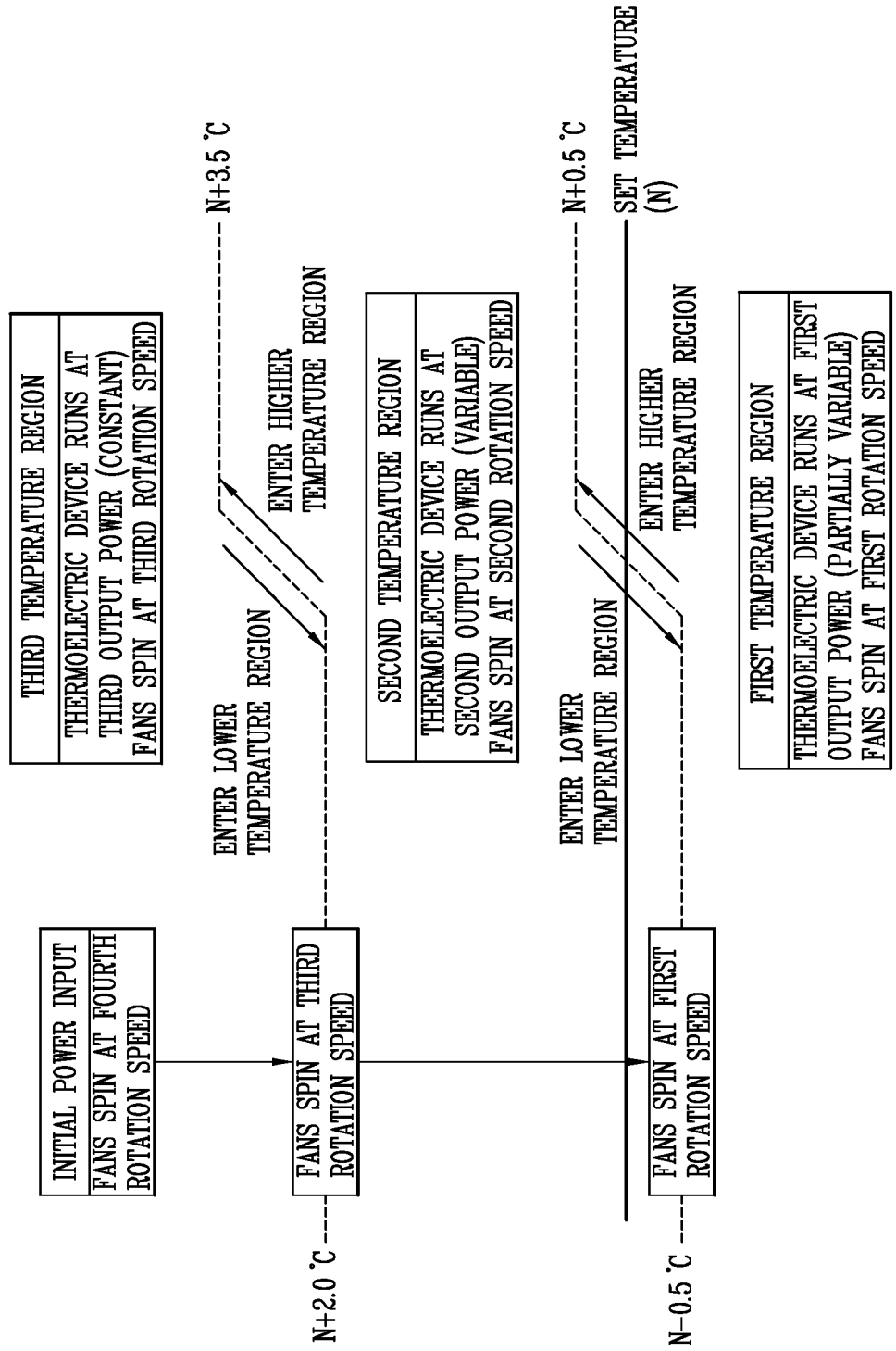
FIG. 4 is a conceptual diagram explaining a method of controlling a refrigerator based on which of first to third temperature regions the temperature of a storage compartment falls within.

FIG. 4 is a conceptual diagram explaining a method of controlling a refrigerator based on one of first to third temperature regions that corresponds to the temperature of a storage compartment.

The temperature ranges for the storage compartment may be divided into a first temperature region, a second temperature region, and a third temperature region. The first, the second, and the third temperature regions (or temperature ranges) may be ranges in temperature relative to a set temperature. For example, when the set temperature is 3° C. (or 37° F.), the first temperature region may be at lower temperatures than when the set temperature is 8° C. (or 46° F.). Here, the size of the range may be the same or different.

Here, the first temperature region may be a range that includes the set temperature input by the user. The second temperature region may be a temperature region higher than the first temperature region. The third temperature region may be a temperature region higher than the second temperature region. As such, the temperature increases sequentially from the first temperature region to the third temperature region.

Since the first temperature region includes the set temperature input by the user, if the temperature of the storage compartment is within the first temperature region, the temperature of the storage compartment has already reached the set temperature due to the operation of the thermoelectric device module. Therefore, the first temperature region is a range in which the set temperature has been met.

The second temperature region and the third temperature region are ranges higher than the set temperature input by the user, and are therefore may be referred to as unsatisfactory ranges in which the set temperature has not been met. Thus, in the second and third temperature regions, operation of the thermoelectric device module is required to lower the temperature of the storage compartment to the set temperature. The third temperature region may require much stronger cooling since it is at higher temperatures than the second temperature region. The second temperature region and the third temperature region may also be referred to as an unsatisfactory range and an upper limit range, respectively, to distinguish them from each other.

The boundary of each temperature region depends on whether the temperature of the storage compartment enters a higher or lower temperature region, and the temperature to enter a higher region may be different than a temperature to enter a lower region. This range in temperature points to enter different regions may be referred to as a maintenance band. For example, referring to FIG. 4, a point at which the temperature of the storage compartment enters the second temperature region from the first temperature region may be N+0.5° C. In contrast, a point at which the temperature of the storage compartment enters the second temperature region from the first temperature region may be N−0.5° C. Accordingly, a point at which the temperature of the storage compartment enters a higher temperature region is higher than a point at which the temperature of the storage compartment enters a lower temperature region.

The point N+0.5° C. at which the temperature of the storage compartment enters the second temperature region from the first temperature region may be higher than the set temperature N input by the user. In contrast, the point N−0.5° C. at which the temperature of the storage compartment enters the first temperature region from the second temperature region may be lower than the set temperature N input by the user.

Likewise, referring to FIG. 4, a point at which the temperature of the storage compartment enters the third temperature region from the second temperature region may be N+3.5° C. In contrast, a point at which the temperature of the storage compartment enters the second temperature region from the second temperature region may be N+2.0° C. Accordingly, a point at which the temperature of the storage compartment enters a higher temperature region is higher than a point at which the temperature of the storage compartment enters a lower temperature region.

If a point at which the temperature of the storage compartment enters a higher temperature region and a point at which the temperature of the storage compartment enters a lower temperature region are equal, the storage compartment may not be sufficiently cooled and the control of the thermoelectric device or fans is changed. For example, if the set temperature is reached as soon as the temperature of the storage compartment enters the first temperature region from the second temperature region, and therefore the thermoelectric device and the fans stop running, the temperature of the storage compartment immediately enters the second temperature region. To prevent this and sufficiently maintain the temperature of the storage compartment in the first temperature region, a maintenance band may be provided where a point at which the temperature of the storage compartment enters the lower temperature must be lower than a point at which the temperature of the storage compartment enters the higher temperature region. A size of the maintenance band may be adjusted based on temperature in the storage compartment, outside temperature, a desired level of responsiveness of the system, or the like based on the application and installation of the refrigerator. Moreover, the maintenance band for higher temperature regions (e.g., 1.5° C.) may be greater than that of the lower maintenance band (e.g., 1.0° C.). The maintenance band may prevent excessive wear and tear of components as well as excessive changes in modes of operation.

Here, the output power of the thermoelectric device and the rotation speed of the fans relative to a certain set temperature will be described first. Then, changes in control relative to a set temperature will be described.

The thermoelectric device's output power relative to a certain set temperature N1 is shown in Table 1. If a side of the thermoelectric device in contact with the first heat sink corresponds to a heat absorption side, the Hot/Cool section of Table 1 is marked as Cool, and if this side corresponds to a heat dissipation side, the Hot/Cool section of Table 1 is marked as Hot. Also, RT refers to the outside temperature (or room temperature) of the refrigerator.

TABLE 1

| No. | Condition (first set temperature N1) | Hot/ Cool | RT < 12° C. | RT > 12° C. | RT > 18° C. | RT > 27° C. |
|---|---|---|---|---|---|---|
| 1 | Third temperature region | Cool | +22 V | +22 V | +22 V | +22 V |
| 2 | Second temperature region | Cool | +12 V | +14 V | +16 V | +22 V |
| 3 | First temperature region | Cool | 0 V | 0 V | +12 V | +16 V |

The output power of the thermoelectric device is determined based on whether the temperature of the storage compartment is within the first, second, or third temperature regions.

The thermoelectric device's output power may be derived from the voltage applied to the thermoelectric device since the thermoelectric device's output power increases as the voltage applied to the thermoelectric device becomes higher. An increase in the thermoelectric device's output power allows the thermoelectric device to achieve stronger cooling.

Meanwhile, the rotation speed of the fans is determined based on whether the temperature of the storage compartment falls within the first, second, or third temperature regions. Here, the fans refer to the first and/or second fan of the thermoelectric device module.

The rotation speed of the fans may be represented in the number of rotations of the fans per unit of time or RPM. A fan running at a higher RPM means that the fan spins faster. When a higher voltage is applied to the fan, the number of rotations of the fan is increased. With the fan spinning faster, the heat transfer of the first heat sink and/or second heat sink is enhanced, thereby achieving stronger cooling.

Referring to FIG. 4, if the temperature of the storage compartment falls within the third temperature region, the thermoelectric device runs at the third output power. In Table 1, the third output power may be +22V regardless of the outside temperature. The third output power may be a constant value regardless of the outside temperature.

The third output power (+22V) may be a value that exceeds the first output power (e.g., 0V, +12V, and +16V in Table 1) in the first temperature region. Also, the third output power may be a value equal to or higher than the second output power (e.g., +12V, +14V, +16V, and +22V in Table 1) in the second temperature region.

The third output power may correspond to the highest output power of the thermoelectric device. In this case, the output power of the thermoelectric device in the third temperature region may remain constant at the highest output power.

Moreover, if the temperature of the storage compartment falls within the third temperature region, the fan spins at the third rotation speed. Here, the third rotation speed is a value exceeding the first rotation speed in the first temperature region. Also, the third rotation speed is a value equal to or higher than the second rotation speed in the second temperature region.

If the temperature of the storage compartment falls within the second temperature region, the thermoelectric device runs at the second output power. Here, the second output power is not a constant value but may be a value that gradually varies (increases) as the outside temperature measured by the external air temperature sensor increases. In Table 1, the second output power gradually increases to +12V, +14V, +16V, and +22V with increasing outside temperature.

Under the same outside temperature condition, the second output power is a value higher than the first output power in the first temperature region. Referring to Table 1, under the condition RT<12° C., the second output power may be +12V, higher than the first output power 0V. Under the condition RT>12° C., the second output power may be +14V, higher than the first output power 0V. Under the condition RT>18° C., the second output power may be +16V, higher than the first output power +12V. Under the condition RT>27° C., the second output power may be +22V, higher than the first output power +16V.

The second output power is a value lower than the third output power in the third temperature region. Referring to Table. 1, under every outside temperature condition, the second output power +12V, +14V, +16V, and +22V is equal to or lower than the third output power +22V.

Meanwhile, if the temperature of the storage compartment falls within the second temperature region, the fan spins at the second rotation speed. Here, the second rotation speed is a value equal to or higher than the first rotation speed in the first temperature region. Also, the second rotation speed is a value equal to or lower than the third rotation speed in the third temperature region.

If the temperature of the storage compartment falls within the first temperature region, the thermoelectric device runs at the first output power. Here, the first output power is not a constant value but may be a value that gradually varies (increases) as the outside temperature measured by the external air temperature sensor increases. Notably, in the first temperature region, when the outside temperature is higher than a reference outside temperature, the second output power gradually increases to 0V, +12V, and +16V with increasing outside temperature. However, in the first temperature region, when the outside temperature is equal to or lower than the reference outside temperature, the first output power is maintained at 0. That is, the thermoelectric device is kept in a stopped state. In Table 1, the reference outside temperature may be a value between 12° C. and 18° C.—for example, 15° C.

When comparing the first and second temperature regions in Table 1, the number of gradual increases in the second output power is higher than the number of gradual increases in the first output power in the same temperature range. The second output power changes in four stages: +12V, +14V, +16V, and +22V, whereas the first output power changes in three stages: 0V, +12V, and +16V in the same temperature range. Accordingly, the second temperature region corresponds to the entire variation region, and the first temperature region corresponds to a partial variation region.

Under the same outside temperature condition, the first output power may be a value lower than the second output power in the second temperature region. Referring again to Table 1, under the condition RT<12° C., the first output power 0V is lower than the second output power +12V. Under the condition RT>12° C., the first output power 0V is lower than the second output power +14V. Under the condition RT>18° C., the first output power +12V is lower than the second output power +16V. Under the condition RT>27° C., the first output power +16V is lower than the second output power +22V.

The first output power is a value lower than the third output power in the third temperature region. Referring again to Table 1, under every outside temperature condition, the first output power 0V, 0V, +12V, and +16V is lower than the third output power +22V.

The first output power includes 0 (e.g., 0V or 0 W). The output power 0 means that no voltage is applied to the thermoelectric device and the thermoelectric device is in a stopped state. That is, if the temperature of the storage compartment drops to a set temperature input by the user, the thermoelectric device may stop running.

Meanwhile, if the temperature of the storage compartment falls within the first temperature region, the fan spins at the first rotation speed. Here, the first rotation speed is a value equal to or lower than the second rotation speed in the second temperature region. Also, the first rotation speed is a value lower than the third rotation speed in the third temperature region.

The first rotation speed of the fan is higher than 0 (e.g., 0 RPM), which is different from the first output power of the thermoelectric device which includes 0. That is, this means that the fan is able to keep running when no voltage is applied to the thermoelectric device.

For example, under the condition RT<12° C., if the temperature of the storage compartment drops and enters the first temperature region from the second temperature region, no voltage may be applied to the thermoelectric device (e.g., when the first output power is 0V at RT<12° C. in Table 1). However, even when the temperature of the storage compartment enters the first temperature region from the second temperature region, the fan may keep spinning but at a lower rotation speed.

This is because the thermoelectric device remains cool for a considerable period of time even after it stops running, rather than being immediately brought to the ambient temperature. Thus, if the fan keeps spinning, this helps to continuously facilitate the heat transfer of the first heat sink and sufficiently maintain the temperature of the storage compartment in the first temperature region.

In conventional refrigerators, the temperature range of the storage compartment is divided into two stages: satisfactory and unsatisfactory, and the refrigeration cycle device runs only in the unsatisfactory region to lower the temperature of the storage compartment to a set temperature. Particularly, in the case of a refrigerator with a refrigeration cycle device, the temperature of the storage compartment cannot be divided and controlled in three stages. This is because turning the compressor on and off too often adversely affects the mechanical reliability of the compressor. The loss in mechanical reliability may be more detrimental than any benefits of operation in multiple the temperature ranges.

On the contrary, in a refrigerator with a thermoelectric device module, the temperature of the storage compartment may be divided into three stages for more detailed control, as in the control method proposed in the present disclosure. The thermoelectric device module only turns on and off electrically when a voltage is applied, which is not related to mechanical reliability and does not lead to degradation in reliability even if the thermoelectric device module is more frequently turned on and off.

Particularly, the cooling performance of the thermoelectric device module may be far below that of a refrigeration cycle device with a compressor. Thus, if the temperature of the storage compartment rises and enters the unsatisfactory region due to initial power input, the thermoelectric device being in a stopped state, application of a load such as food into the storage compartment, and other reasons, it takes a long time for the temperature of the storage compartment to rise and return to the satisfactory region. Accordingly, by defining the temperature of the storage compartment in three stages, apart from satisfactory and unsatisfactory, the temperature of the storage compartment can be quickly lowered from the third temperature region for the highest temperature at the highest output power.

Moreover, the first temperature region and the second temperature region are for reducing power consumption and fan noise, as well as for cooling. The refrigerator of the present disclosure can reduce power consumption and fan noise at the same time by segmenting the temperature range of the storage compartment and lowering the output power of the thermoelectric device and the rotation speed of the fans as the temperature of the storage compartment decreases.

Meanwhile, the rotation speed of the fan may be determined based on (a) a storage compartment temperature condition and (b) an initial power input condition. The storage compartment temperature condition may refer to the temperature of the storage compartment or the range or region in which the temperature resides. The initial power input condition may refer to initially supplying power to the refrigerator or re-supplying power to the refrigerator. This will be described with reference to the step S700 of FIG. 3 and FIG. 4.

The storage compartment is maintained at ambient temperature before initial power is inputted into the refrigerator, because the storage compartment has not been cooled at this point. Thus, when initial power is inputted into the refrigerator, the temperature of the storage compartment should be lowered as quickly as possible.

The storage compartment may normally be set to a temperature N of 2 to 3° C. Referring to FIG. 4, a point N+3.5° C. at which the temperature of the storage compartment enters the third temperature region from the second temperature region is 3.5 to 5.5° C. Taking into account that the indoor temperature (the outside temperature of the refrigerator) is usually about 20° C., the temperature of the storage compartment falls within the third temperature region when initial power is inputted into the refrigerator.

When initial power is inputted into the refrigerator, the fan may be controlled to keep spinning at a rotation speed exceeding the third rotation speed until the temperature falls from the third temperature region to the second temperature region. This state of increased fan speed may be maintained until a preset temperature within the second temperature region is reached. In normal operation, the fan is normally operated at the second rotation speed in the second temperature region. However, under the initial power input condition, the fan is controlled to operate at an increased rotation speed exceeding the third rotation speed even after the temperature of the storage compartment falls into the second temperature region. This is because, when initial power is inputted into the refrigerator, it is desirable that the temperature of the storage compartment is lowered as quickly as possible. For convenience of explanation, the rotation speed exceeding the third rotation speed will be referred to herein a fourth rotation speed.

The preset temperature may be a certain temperature that is within the second temperature region. The preset temperature may correspond to a point at which the temperature of the storage compartment enters the second temperature region from the third temperature region. In this case, the fan may be controlled to spin at the third rotation speed until the temperature of the storage compartment enters the second temperature region from the third temperature region.

In this case where initial power is inputted into the refrigerator, the fan may be controlled to operate at the third rotation speed in the second temperature region until the temperature of the storage compartment enters the first temperature region, even after the preset temperature is reached. In normal operation, the fan is normally controlled to operate at the second rotation speed in the second temperature region. However, under the initial power input condition, the fan may be maintained at the third rotation speed for extended periods to enable rapid cooling.

Afterwards, once the temperature is within the first temperature region, the fan is controlled to spin at the first rotation speed until conditions in the storage compartment require a change in operation (e.g., rise in temperature into the second temperature region).

The first rotation speed may be maintained to be greater than 0 RPM. Thus, when the fan spins at the first rotation speed in the first temperature region, the fan may continue to spin without stopping, although at lower speeds.

When the temperature of the storage compartment falls within the first temperature region, the set temperature input by the user is met. By continuing to operate the fan in the first temperature region even when the temperature of the storage compartment meets the set temperature, a rise in temperature of the storage compartment may be delayed.

Hereinafter, an extended concept of defrosting will be described. The extended concept of defrosting proposed in the present disclosure is to achieve quick defrosting and power consumption reduction by using heat source defrosting and natural defrosting in combination according to conditions. The heat source defrosting refers to defrosting the thermoelectric device module by supplying energy, and the natural defrosting refers to waiting for the thermoelectric device to defrost naturally without supplying energy. In natural defrosting, the heat source is the waste heat of the second heat sink.

Figure 5:
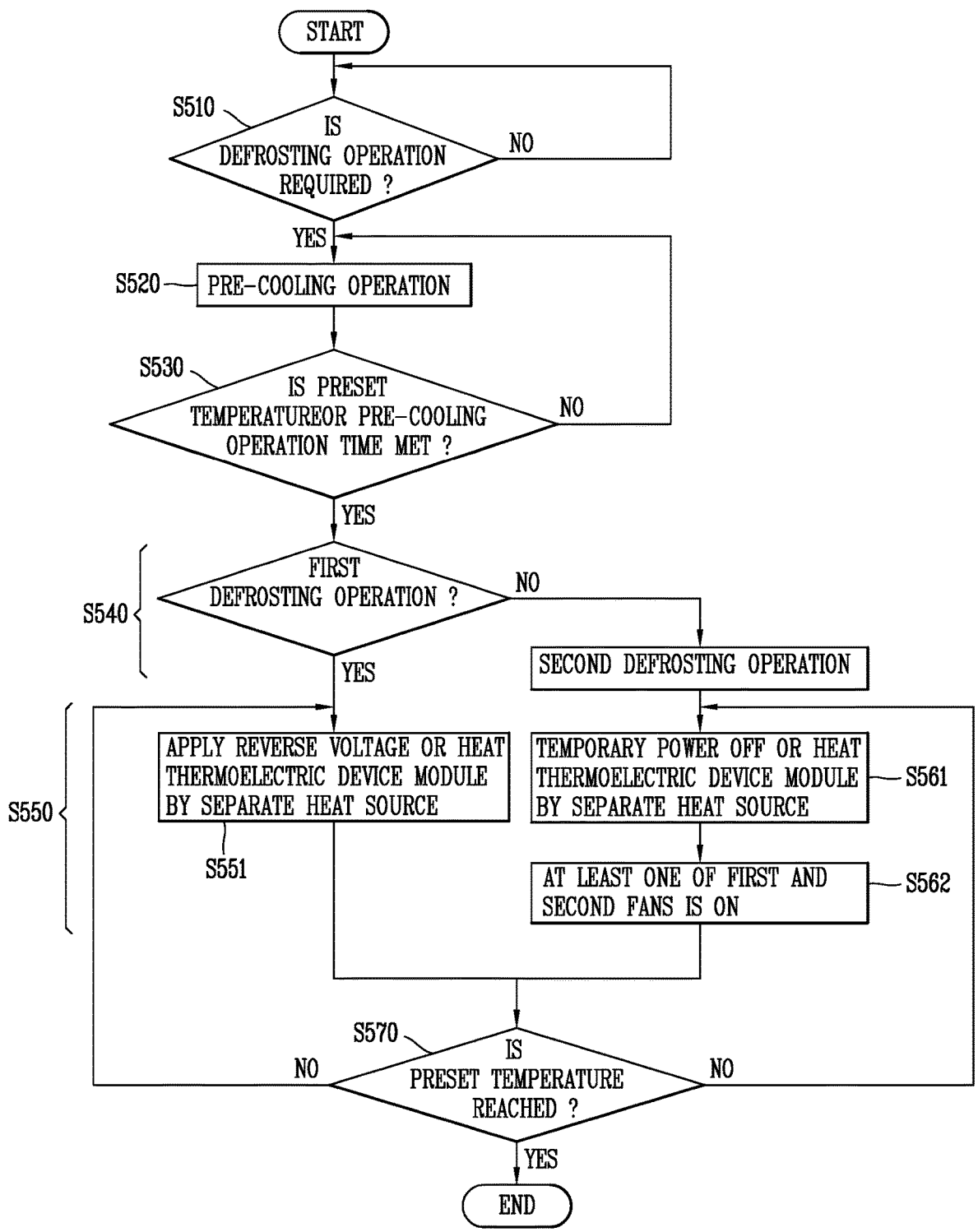
FIG. 5 is a flowchart showing the control of a defrosting operation of a refrigerator with a thermoelectric device module.

FIG. 5 is a flowchart showing the control of a defrosting operation of a refrigerator with a thermoelectric device module. First, it is determined whether a defrosting operation is required (S510). When the thermoelectric device module runs continuously or cumulatively for a prescribed amount of time, frost may form on the first heat sink. The defrosting process refers to an operation of removing the built up frost.

The controller 180 may be configured to start a defrosting operation based on the temperature or humidity of the storage compartment measured by the sensor unit 191, 192, 193, 194, and 195 or the cumulative operating time of the thermoelectric device module 170. For example, if the thermoelectric device module has run continuously or cumulatively for a preset amount of time after a previous defrosting operation, it is expected that frost will form on the thermoelectric device module. Thus, the defrosting operation may be performed.

If the air pressure of the first fan is too low, it is expected that frost will form or has formed on the first heat sink. Thus, the defrosting operation may be performed. The air pressure of the first fan may be measured by the sensor unit.

Once the defrosting operation is started, the thermoelectric device module may perform a pre-cooling operation (S520). In the pre-cooling operation, the power to the thermoelectric device module may not be immediately cut-off, but may sequentially decrease the output power of the thermoelectric device to 0 (e.g., 0V).

Next, it is determined whether the pre-cooling operation is complete (S530). If the temperature of the thermoelectric device module measured by the defrosting temperature sensor reaches a preset temperature or a preset amount of pre-cooling operation time (e.g., 30 minutes) elapses, it may be determined that the pre-cooling operation has completed.

Upon completion of the pre-cooling operation, either a first defrosting operation (first defrost mode) or a second defrosting operation (second defrost mode) is selected based on the outside temperature or the temperature of the thermoelectric device module (S540). The first defrosting operation may be selected when rapid cooling is required and natural defrosting alone is not enough. The second defrosting operation may be selected when rapid cooling is not required.

A criteria for selecting the first defrosting operation or the second defrosting operation may include the outside temperature. If the outside temperature measured by the sensor unit is equal to or lower than a reference defrosting temperature (e.g., <12° C.), the first defrosting operation may be selected. At lower outside temperatures, rapid cooling is required since frost may more easily be formed.

On the contrary, if the outside temperature measured by the sensor unit is higher than the reference defrosting temperature (e.g., >12° C.), the second defrosting operation may be selected. At higher outside temperatures, frost may not form as easily.

Meanwhile, the defrosting operation may be selected based on the temperature of the thermoelectric device module measured by the defrosting temperature sensor. If the temperature of the thermoelectric device module measured by the defrosting temperature sensor is equal to or lower than a reference defrosting temperature (e.g., −10° C.), the first defrosting operation may be selected. When the thermoelectric device module is at lower temperatures, rapid cooling may be required since frost may more easily be formed.

On the contrary, if temperature of the thermoelectric device module measured by the defrosting temperature sensor is higher than a reference defrosting temperature (e.g., −10° C.), the second defrosting operation is selected. When the temperature of the thermoelectric device module is higher, frost may not form as easily.

To distinguish between different reference defrosting temperatures, the reference defrosting temperature for selecting the defrosting operation based on the outside temperature measured by the sensor unit may be referred to as a first reference defrosting temperature, and the reference defrosting temperature for selecting the defrosting operation based on the temperature of the thermoelectric device measured by the defrosting sensor unit may be referred to as a second reference defrosting temperature.

Referring again to FIG. 5, the defrosting operation may be performed in step S550 for both the first defrost operation and the second defrost operation. In the first defrosting operation, in step S551, a reverse voltage may be applied to the thermoelectric device, or the thermoelectric device module may be heated by a separate heat source. When a reverse voltage (e.g., a negative voltage) is applied to the thermoelectric device, the heat absorption side and the heat generation side are reversed and heat is therefore transferred to the first heat sink. The separate heat source refers to a heat source other than the thermoelectric device module—for example, a heater.

The reverse voltage applied to the thermoelectric device may be constant regardless of the set temperature input by the user. For example, the reverse voltage may be constant at −10V regardless of the set temperature input by the user.

In the first defrosting operation, in step S551, the first fan and the second fan may be controlled to keep spinning. The first fan and the second fan may keep spinning as long as a reverse voltage is applied to the thermoelectric device. When the reverse voltage is applied to the thermoelectric device, the first fan and the second fan should be controlled to continue to spin in order to facilitate heat transfer through the first and second heat sinks. With the reverse voltage applied to the thermoelectric device, the defrosting efficiency can be improved when compared to, for example, natural defrosting.

In the second defrosting operation, in step S561, natural defrosting is carried out by leaving the thermoelectric device in a stopped state, or the thermoelectric device module is heated by a separate heat source. However, the amount of heat supplied by the separate heat source in the second defrosting operation may be smaller than the amount of heat supplied by the separate heat source in the first defrosting operation. Accordingly, when the second defrosting operation is selected, power consumption may be reduced.

In the second defrosting operation, at least one of the first or second fans may be controlled to keep spinning. Here, at least one of the first or second fans may keep spinning as long as the thermoelectric device is stopped from running.

For example, in the second defrosting operation, the thermoelectric device may stop running, and the first fan may keep spinning, while the second fan may be controlled to temporarily stop running. The temporary stopping means that the second fan will spin again after a certain amount of time. For example, the second fan may be operated periodically or intermittently. In this case, the second fan may resume spinning while the thermoelectric device is in the stopped state and the first fan keeps spinning (S562).

In another example, when the internal temperature of the refrigerator is within the first temperature region and the thermoelectric device stops running, the first fan and the second fan may be operated to keep spinning. If the temperature of the storage compartment is in the first temperature region, this may indicate that the temperature of the storage compartment is sufficiently low to cause frost to be easily formed. Therefore, it may be desirable that both the first and second fans are controlled to keep spinning in order to achieve reduction in power consumption and quicker defrosting by natural defrosting.

If the outside temperature measured by the sensor unit is equal to or lower than a reference defrosting temperature (e.g., 12° C.), the first defrosting operation may be selected. In this case, a reverse voltage is applied to the thermoelectric device. If the outside temperature measured by the sensor unit is higher than the reference defrosting temperature (e.g., 12° C.), the second defrosting operation may be selected. In this case, the thermoelectric device may be stopped from running to undergo natural defrosting. The thermoelectric device module may also be heated by a separate heat source.

If the temperature of the thermoelectric device module measured by the defrosting temperature sensor is equal to or lower than a reference defrosting temperature (e.g., −10° C.), the first defrosting operation may be selected. In this case, a reverse voltage may be applied to the thermoelectric device, or the thermoelectric device module may be heated by a separate heat source. On the contrary, if temperature of the thermoelectric device module measured by the defrosting temperature sensor is higher than a reference defrosting temperature (e.g., −10° C.), the second defrosting operation may be selected. In this case, the thermoelectric device may stop running, and frost may be removed by natural defrosting.

Completion of the defrosting operation may be determined based on temperature (S570). When the temperature of the defrosting temperature sensor mounted to the thermoelectric device module reaches a preset temperature (e.g., 5° C.), the defrosting operation may be finished.

Figure 6:
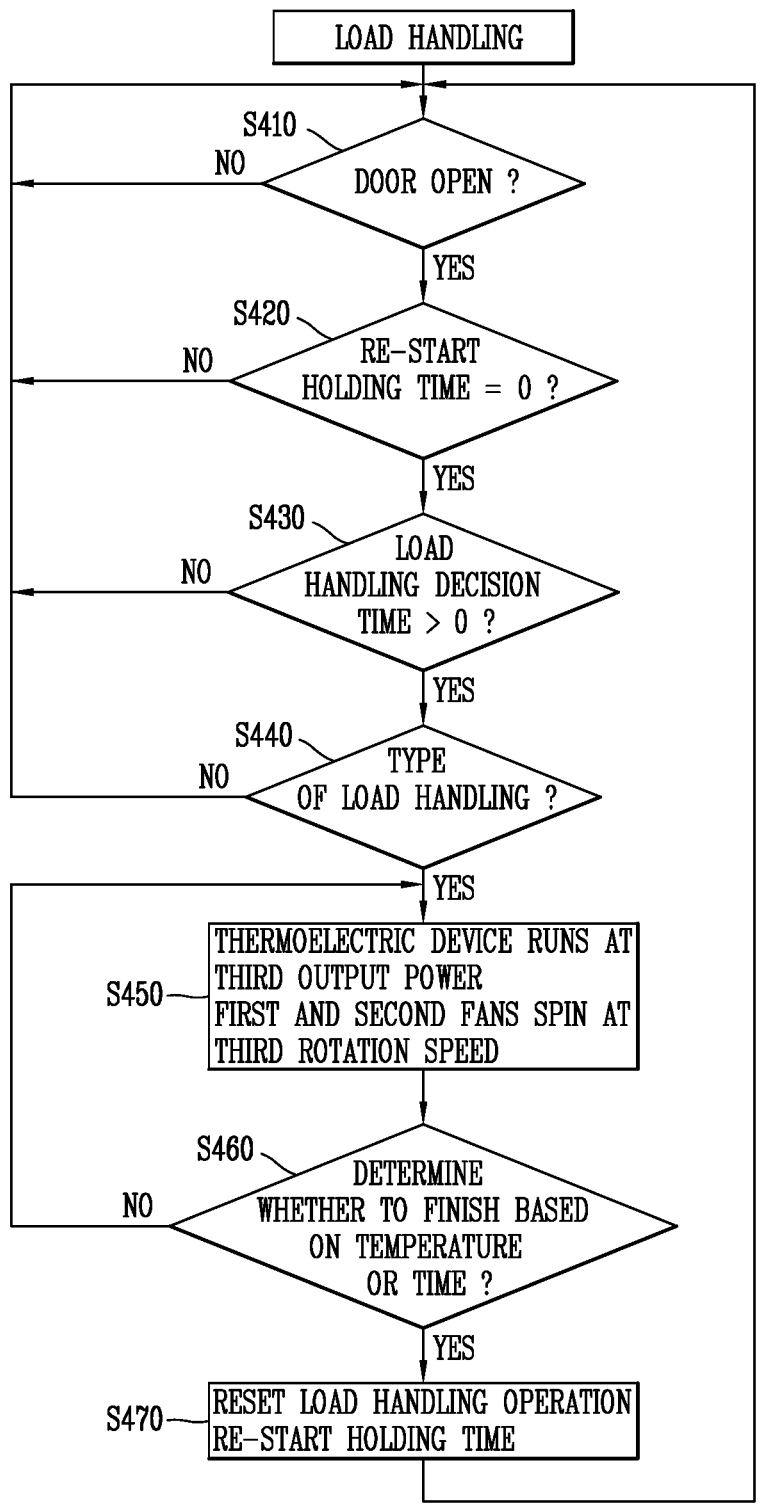
FIG. 6 is a flowchart showing the control of a load handling operation of a refrigerator with a thermoelectric device module.

FIG. 6 is a flowchart showing the control of a load handling operation of a refrigerator with a thermoelectric device module. First, it may be determined whether a door is open or not (S410). A load refers to something that requires rapid cooling of the storage compartment, for example, because the door is open or food is loaded after the door is opened. Thus, it is necessary to determine whether to perform a load handling operation after the door is opened.

If the door is detected as being open, it may be determined whether a load handling operation re-start holding time is zeroed out (S420). The re-start holding time may prevent a load handling operation from occurring for a prescribed amount of time after a load handling operation has completed. Once a load handling operation is complete and a need arises to cool the storage compartment again, a subsequent load handling operation may be prevented from starting until after a preset time. This is for preventing overcooling. When the preset time is counted down to 0, the load handling operation may be re-started.

Next, it is checked whether or not a load handling decision time is longer than 0 (S430). The load handling operation may be started only after the door is opened and then closed. For example, if the temperature of the storage compartment rises by 2° C. or more within 5 minutes after the door is closed, the load handling operation may be started. The load handling operation decision time may be counted after the door is closed. Thus, even if the temperature of the storage compartment rises by 2° C. or more compared to before the door is opened, the load handling operation may not be started unless the door is closed (e.g., the load handling decision time is 0 before the door closes). If the temperature of the storage compartment rises by a preset amount within a preset time after the door is opened and then closed, the controller starts a load handling operation.

Next, the type of load handling operation may be determined (S440). A first load handling operation may be started when hot food is loaded into the storage compartment and therefore rapid cooling is required. For example, the first load handling operation may be started when the temperature of the storage compartment rises by 2° C. or more within 5 minutes after the door is opened and closed.

A second load handling operation may be started when food having a high thermal capacity is loaded, and therefore consistent or prolonged cooling is required. For example, the second load handling operation may be started when the temperature of the storage compartment rises by 8° C. or more compared to a set temperature input by the user within 20 minutes after the door is opened and closed. If the first load handling operation is selected, the second load handling operation may be not started. If neither the first load handling operation nor the second load handling operation is selected, the controller does not start any load handling operation.

In a load handling operation, the thermoelectric device may be controlled to run at the third output power, regardless of whether the temperature of the storage compartment is in the first, second, and third temperature regions (S450). The third output power may correspond to the highest output power of the thermoelectric device.

If a load handling operation is required, this may indicate that the temperature of the storage compartment already has entered or is very likely to enter the third temperature region. Thus, the thermoelectric device may be controlled to run at the third output power for rapid cooling.

In a load handling operation, the fans may run at the third output power, regardless of whether the temperature of the storage compartment falls within the first, second, or third temperature regions. However, the third rotation speed of the first fan and the third rotation speed of the second fan may be different, and the second fan may be controlled to spin at a higher speed than the first fan.

Likewise, if a load handling operation is required, this may indicate that the temperature of the storage compartment has already entered or is very likely to enter the third temperature region. Thus, the fans may be controlled to spin at the third rotation speed for rapid cooling. Here, the fan spins more slowly in the load handling operation than when initial power is inputted. This is may reduce fan noise.

Next, it may be determined whether the load handling operation has finished based on temperature or time (S460). For example, the load handling operation may be completed when the temperature of the storage compartment has dropped by a preset amount from a set temperature or a preset amount of time elapses since the start of the load handling operation. The load handling operation re-start holding time may be reset and the timer may be started again (S470).

Referring to Table 2 and Table 3, the rotation speeds of the first and second fans are compared. Table 2 shows when the first fan turns on or off, and Table 3 shows when the second fan turns on or off.

The fan may be controlled such that if the voltage supplied to the fan increases, the rotation speed of the fan increases. Accordingly, the rotation speed of the fan can be derived from the voltage supplied to the fan.

TABLE 2

| ON condition | | | |
|---|---|---|---|
| Fourth rotation speed (9.5 V) | Third rotation speed (9 V) | First and second rotation speeds (8.5 V) | OFF condition |
| Initial power input | Defrosting operation Load handling operation Third temperature region | First temperature region Second temperature region | Door open |

TABLE 3

| ON condition | | | |
|---|---|---|---|
| Fourth rotation speed (12 V) | Third rotation speed (11.5 V) | First and second rotation speeds (10.5 V) | OFF condition |
| Initial power input | Defrosting operation Load handling operation Third temperature region | First temperature region Second temperature region | — |

As illustrated in Tables 2 and 3, the rotation speed of the second fan may be higher than the rotation speed of the first fan. The lowest first rotation speed of the second fan may be higher than the highest fourth rotation speed of the first fan.

The reason why the rotation speed of the second fan is higher than the rotation speed of the first fan is because sufficient heat dissipation is required at the heat dissipation side of the thermoelectric device to ensure that the temperature of the heat absorption part is sufficiently low. This applies equally when the second heat sink is larger in size than the first heat sink.

Meanwhile, when the door is open, the first fan disposed in the storage compartment may be stopped but the second fan may not be stopped, because air pressure is not delivered to the user even while the second fan keeps spinning.

The thermoelectric device module and fan as broadly described and embodied herein addresses various deficiencies. One aspect of the present disclosure is to propose a control method suitable for a refrigerator with a thermoelectric device that either cools or generates heat depending on voltage polarity, and a refrigerator controlled by this control method.

Another aspect of the present disclosure is to provide a method of controlling a refrigerator, that can control fans in a thermoelectric device module based on a storage compartment temperature condition and an initial power input condition, and a refrigerator controlled by this control method.

Yet another aspect of the present disclosure is to provide a control method that can achieve sufficient cooling performance and fan noise reduction depending on the temperature of the storage compartment, and a refrigerator controlled by this control method.

An exemplary embodiment of the present disclosure provides a refrigerator which may include a sensor unit configured to measure the temperature of a storage compartment; a thermoelectric device module having at least one fan and configured to cool the storage compartment; and a controller that controls the rotation speed of the fan, wherein the rotation speed of the fan is determined based on (a) a storage compartment temperature condition divided in three stages and (b) an initial power input condition.

Specifically, the storage compartment temperature condition measured by the sensor unit (a) may be determined based on which among a first temperature region including a set temperature input by the user, a second temperature region higher than the first temperature region, and a third temperature region higher than the second temperature region the temperature of the storage compartment falls within.

In the first temperature region, the fan may spin at a first rotation speed higher than 0 (RPM), in the second temperature region, the fan may spin at a second rotation speed equal to or higher than the first rotation speed, and in the third temperature region, the fan may spin at a third rotation speed which exceeds the first rotation speed and is equal or higher than the second rotation speed.

When initial power is inputted into the refrigerator (b), the fan may keep spinning at a rotation speed exceeding the third rotation speed until a preset temperature falling within the second temperature region is reached after the temperature of the storage compartment enters the second temperature region from the third temperature region.

When initial power is inputted into the refrigerator (b), the fan may keep spinning at the third rotation speed until the temperature of the storage compartment enters the first temperature region after the preset temperature is reached, and the fan spins at the first rotation speed until the storage compartment condition changes after the temperature of the storage compartment enters the first temperature region.

A point at which the temperature of the storage compartment enters the second temperature region from the first temperature region may be higher than a point at which the temperature of the storage compartment enters the first temperature region from the second temperature region, and a point at which the temperature of the storage compartment enters the third temperature region from the second temperature region may be higher than a point at which the temperature of the storage compartment enters the second temperature region from the third temperature region.

The point at which the temperature of the storage compartment enters the second temperature region from the first temperature region may be higher than the set temperature input by the user, and the point at which the temperature of the storage compartment enters the first temperature region from the second temperature region may be lower than the set temperature input by the user.

The preset temperature may corresponds to the point at which the temperature of the storage compartment enters the second temperature region from the third temperature region.

The thermoelectric device module may further include a first heat sink disposed to make contact with a heat absorption part of the thermoelectric device and configured to exchange heat with the storage compartment, and a second heat sink disposed to make contact with a heat radiation part of the thermoelectric device and configured to exchange heat with an outside area of the storage compartment, the at least one fan including a first fan mounted to face the first heat sink and blowing air to facilitate the heat transfer of the first heat sink, and a second fan mounted to face the second heat sink and blowing air to facilitate the heat transfer of the second heat sink.

The rotation speed of the second fan may be higher than the rotation speed of the first fan. The fan may spin in a defrosting operation for removing frost formed on the thermoelectric device module, and the fan may spin more slowly in the defrosting operation than (b) when initial power is inputted.

The sensor unit may be configured to measure the humidity of the storage compartment or the air pressure of the fan, and the controller is configured to start a defrosting operation based on the temperature or humidity of the storage compartment measured by the sensor unit, the air pressure of the fan measured by the sensor unit, or the cumulative operating time of the thermoelectric device module.

In the defrosting operation, the thermoelectric device may stop running, the first fan may keep spinning, and the second fan may stop running. In the defrosting operation, the second fan may spin again after a preset amount of time while the thermoelectric device is in the stopped state and the second fan keeps spinning.

In the defrosting operation, a reverse voltage may be applied to the thermoelectric device, and the first fan and the second fan may keep spinning. In the defrosting operation, the thermoelectric device may stop running, and at least one of the first and second fans may keep running. When a reverse voltage is applied to the thermoelectric device, the first fan and the second fan may keep spinning.

When the thermoelectric device stops running, at least of the first and second fans may keep spinning. In the first temperature region, when the thermoelectric device stops running, the first fan and the second fan may keep spinning.

The sensor unit may be configured to measure the humidity of the storage compartment or the air pressure of the fan, and the controller may be configured to start a defrosting operation based on the temperature or humidity of the storage compartment measured by the sensor unit, the air pressure of the fan measured by the sensor unit, or the cumulative operating time of the thermoelectric device module, and in the defrosting operation, the thermoelectric device stops running, the first fan keeps spinning, and the second fan stops running. In the defrosting operation, the second fan may spin again after a preset amount of time while the thermoelectric device is in the stopped state and the second fan keeps spinning.

The refrigerator may further include a door configured to open or close the storage compartment, wherein, if the temperature of the storage compartment rises by a preset amount within a preset time after the door is opened and then closed, the controller starts a load handling operation, wherein, in the load handling operation, the fan spins at the third rotation speed, regardless of which of the first, second, and third temperature regions the temperature of the storage compartment falls within, and the fan spins more slowly in the load handling operation than (b) when initial power is inputted.

According to the present disclosure thus constructed, the temperature of the storage compartment, by which the output power of the thermoelectric device is determined, may be divided in three stages, which enables more detailed control compared to when the temperature of the storage compartment is divided in two stages. Specifically, in the first temperature region including a set temperature input by the user, the fan may spin at a low speed (first rotation speed) higher than 0 (RPM), thereby reducing fan noise. When the temperature of the storage compartment enters the second temperature region from the first temperature region, the rotation speed of the fan may increase to the second rotation speed from the first rotation speed. Likewise, when the temperature of the storage compartment enters the third temperature region from the second temperature region, the rotation speed of the fan may increase to the third rotation speed from the second rotation speed. Thus, the fan, along with the thermoelectric device, may rapidly cool the storage compartment. The second temperature region corresponds to a region in which both rapid cooling and fan noise reduction are take into consideration.

Particularly, if the temperature of the storage compartment falls within the first temperature region, this means that it meets the set temperature input by the user, but, despite this, the fan may spin at the first rotation speed higher than 0 RPM in the first temperature region. Even if the thermoelectric device stops running, the temperature of the heat absorption part increases gradually. Thus, when the first fan keeps spinning in the first temperature region, a temperature rise in the storage compartment may be delayed.

Moreover, in the present invention, the rotation speed of the fan may be controlled based on a storage compartment temperature condition and an initial power input condition. Under the initial power input condition, the rotation speed of the fan may be kept high even when the temperature of the storage compartment enters the second temperature region from the third temperature region, thereby allowing the temperature of the storage compartment to quickly enter the first temperature region.

Furthermore, the present disclosure can achieve high defrosting efficiency and power consumption reduction and quickly handle loads by providing defrosting operation and load handling operation in a way suitable for a refrigerator with a thermoelectric device module.

This application relates to U.S. application Ser. No. 15/918,063 (Attorney Docket No. P-1600), filed on Mar. 12, 2018, which is hereby incorporated by reference in its entirety. Further, one of ordinary skill in the art will recognize that features disclosed in these above-noted application may be combined in any combination with features disclosed herein.

The foregoing embodiments and advantages are merely exemplary and are not to be considered as limiting the present invention. The present teachings may be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A refrigerator comprising:
    a first sensor configured to measure a temperature of a storage compartment;
    a thermoelectric device module having a first fan and a second fan, and configured to cool the storage compartment; and
    a controller that controls rotation speed of the first and second fans,
    wherein the controller determines whether a storage compartment temperature condition exists based on whether the temperature of the storage compartment falls within a first temperature region that includes a set temperature input by the user, a second temperature region which is higher than the first temperature region, and a third temperature region which is higher than the second temperature region, wherein in the first temperature region, the first fan or the second fan spins at a first rotation speed higher than 0 RPM, in the second temperature region, the first fan or the second fan spins at a second rotation speed greater than or equal to the first rotation speed, and in the third temperature region, the first fan or the second fan spins at a third rotation speed which exceeds the first rotation speed and is greater than or equal to the second rotation speed, and wherein, when an initial power condition exist such that power is initially supplied to the refrigerator, the first fan or the second fan is controlled to spin at a rotation speed that exceeds the third rotation speed corresponding to the third temperature region until a preset temperature within the second temperature region is reached, even after the temperature of the storage compartment drops into the second temperature region from the third temperature region, and wherein the thermoelectric device module includes:
a thermoelectric device,
a first heat sink disposed to contact with a heat absorption surface of the thermoelectric device and configured to undergo heat exchange with the storage compartment, and
a second heat sink disposed to contact a heat radiation surface of the thermoelectric device and configured to undergo heat exchange outside the storage compartment,
wherein
the first fan is mounted to face the first heat sink and configured to blow air at the first heat sink, and
the second fan is mounted to face the second heat sink and configured to blow air at the second heat sink,
wherein in the first temperature region and in the second temperature region and in the third temperature region, a rotation speed of the second fan is higher than a rotation speed of the first fan.

2. The refrigerator of claim 1, wherein, when the initial power condition exists, the first fan or the second fans is controlled to spin at the third rotation speed in the second temperature region after the preset temperature is reached until the temperature of the storage compartment enters the first temperature region, and the first fan or the second fan is controlled to spin at the first rotation speed after the temperature of the storage compartment enters the first temperature region until a subsequent change in the storage compartment temperature condition is detected.

3. The refrigerator of claim 1, wherein a point at which the temperature of the storage compartment enters the second temperature region from the first temperature region is higher than a point at which the temperature of the storage compartment enters the first temperature region from the second temperature region, and a point at which the temperature of the storage compartment enters the third temperature region from the second temperature region is higher than a point at which the temperature of the storage compartment enters the second temperature region from the third temperature region.

4. The refrigerator of claim 3, wherein the point at which the temperature of the storage compartment enters the second temperature region from the first temperature region is higher than the set temperature input by the user, and the point at which the temperature of the storage compartment enters the first temperature region from the second temperature region is lower than the set temperature input by the user.

5. The refrigerator of claim 3, wherein the preset temperature corresponds to the point at which the temperature of the storage compartment enters the second temperature region from the third temperature region.

6. The refrigerator of claim 1, wherein the controller controls the first and second fans to operate in a defrost mode that removes frost formed on the thermoelectric device module, wherein the first and second fans are controlled to spin at a prescribed rotation speed in the defrost mode that is slower than when the initial power condition is detected.

7. The refrigerator of claim 1, wherein the heat absorption surface undergoes heat exchange with air inside the storage compartment, and the heat radiation surface undergoes heat exchange with air outside the storage compartment, and
wherein a second sensor is configured to measure a humidity inside the storage compartment or an air pressure at the first fan or the second fan, and the controller is configured to start a defrost operation based on at least one of the temperature of the storage compartment, the humidity of the storage compartment, the air pressure, or a cumulative operating time of the thermoelectric device module.

8. The refrigerator of claim 7, wherein, during the defrost operation, the thermoelectric device is controlled to stop operating, the first fan is controlled to keep spinning, and the second fan is controlled to stop spinning.

9. The refrigerator of claim 8, wherein, during the defrost operation, the second fan is controlled to spin after a preset amount of time while the thermoelectric device is in the stopped state and the first fan is controlled to continue spinning.

10. The refrigerator of claim 7, wherein, during the defrost operation, a reverse voltage is applied to the thermoelectric device, and the first fan and the second fan are controlled to spin.

11. The refrigerator of claim 7, wherein, during the defrost operation, the thermoelectric device is controlled to stop operating, and at least one of the first or second fans is controlled to spin.

12. The refrigerator of claim 1, wherein when a reverse voltage is applied to the thermoelectric device to reverse a direction of heat transfer, the first fan and the second fan are controlled to continue spinning.

13. The refrigerator of claim 1, wherein when a voltage to the thermoelectric device is removed to stop operation of the thermoelectric device, at least one of the first fan or the second fan is controlled to spin.

14. The refrigerator of claim 13, wherein, in the first temperature region, when the voltage to the thermoelectric device is removed, the first fan and the second fan are both controlled to spin.

15. The refrigerator of claim 13, wherein a second sensor is configured to measure a humidity in the storage compartment or an air pressure at the first fan or the second fan, and the controller is configured to start a defrost operation based on the temperature of the storage compartment, the humidity in the storage compartment, the air pressure, or a cumulative operating time of the thermoelectric device module, and in the defrost operation, the voltage to the thermoelectric device is removed to stop operation, the first fan is controlled to spin, and the second fan is controlled to stop.

16. The refrigerator of claim 15, wherein, in the defrost operation, the second fan spins again after a preset amount of time while the thermoelectric device is in the stopped state and the first fan keeps spinning.

17. The refrigerator of claim 1, further comprising a door configured to open or close the storage compartment,
   wherein, when the temperature of the storage compartment rises by a prescribed amount within a prescribed amount of time after the door is closed, the controller starts a load handling operation,
   wherein, in the load handling operation, the first or second fans are controlled to spin at the third rotation speed, regardless of whether the temperature of the storage compartment is within the first, second, or third temperature regions, and
   wherein the first and second fans are controlled to spin slower during the load handling operation than during operation after the initial power condition is detected.

* * * * *